United States Patent [19]

Narukawa et al.

[11] Patent Number: 5,508,122
[45] Date of Patent: Apr. 16, 1996

[54] BATTERY WITH A SPIRAL ELECTRODE UNIT

[75] Inventors: Satoshi Narukawa, Sumoto; Toru Amazutsumi, Tsuna; Kazuro Moriwaki, Sumoto, all of Japan

[73] Assignee: Sanyo Electric Co., Ltd., Japan

[21] Appl. No.: 444,046

[22] Filed: May 18, 1995

[30] Foreign Application Priority Data

May 25, 1994 [JP] Japan .................................. 6-111130

[51] Int. Cl.[6] ................................................. H01M 6/10
[52] U.S. Cl. ............................................ 429/94; 29/623.1
[58] Field of Search ............................. 429/94; 29/623.1, 29/623.3

[56] References Cited

U.S. PATENT DOCUMENTS

| | | | |
|---|---|---|---|
| 4,482,615 | 11/1984 | Rosansky et al. | ........................ 429/94 |
| 4,709,472 | 12/1987 | Machida et al. | ........................ 29/623.1 |
| 4,937,154 | 6/1990 | Moses et al. | ............................... 429/94 |
| 5,017,442 | 5/1991 | Watanabe et al. | .......................... 429/94 |

*Primary Examiner*—Anthony Skapars
*Attorney, Agent, or Firm*—Wenderoth, Lind & Ponack

[57] ABSTRACT

Novel lead location and winding configuration allow more efficient spiral electrode fabrication for a battery that is less susceptible to internal short circuits. The battery has separator material sandwiched between positive and negative electrode strips, which are rolled into a spiral electrode unit. The electrodes have active material that covers a core except in regions where leads are attached. One lead is positioned at the outermost winding, and both sides of each lead face either separator material only or the same polarity electrode via separator material. A special lead taping processing step is eliminated.

22 Claims, 6 Drawing Sheets

BATTERY WITH A SPIRAL ELECTRODE UNIT

BACKGROUND OF THE INVENTION

The present invention relates to a battery with a positive electrode strip, a negative electrode strip, and a separator between the two rolled into a spiral electrode unit.

Considering charge collection, leads for the positive electrode strip and the negative electrode strip of prior art spiral electrode units are most often disposed at the center section of each respective electrode strip. Since each lead-to-electrode connecting region of a spiral electrode unit with this structure is in direct opposition to its counterpart, the lead connecting regions are covered with protective tape, insulating tape, or other material to prevent an internal short circuit. However, this means that a taping step to cover the lead connecting regions is required after lead attachment to the electrodes. This is an obstacle to making the manufacturing process continuous. Further, if external force is imposed on this type of battery and a defect such as a burr or flashing is present on the lead, the tape can be damaged allowing the possibility of internal shorting.

The present invention solves the problems described above by allowing simplification of spiral electrode unit processing and by preventing internal short circuits originating in the electrode lead region in a battery with a spiral electrode unit.

The above and further objects and features of the invention will more fully be apparent from the following detailed description with accompanying drawings.

SUMMARY OF THE INVENTION

The battery of the present invention is provided with a rolled spiral electrode unit comprising a positive electrode strip, a negative electrode strip, and a separator between the two. Each electrode strip is a conducting core covered with an active material. Leads are disposed within regions of exposed core material on each electrode. The front and back surfaces of the exposed core lead attachment regions either face the same type of electrode through separator material or face separator material only. Further, one of the leads is positioned on the outermost winding of the spiral electrode unit.

In the battery of the present invention, the front and back surfaces of each lead-to-electrode connecting region are exposed either to the same type of electrode through separator material or to separator material only. As a result of this structure, the battery of the present invention can prevent lead shorting and improve safety characteristics. Further, the battery of the present invention makes continuous processing possible because protective tape does not need to be attached to the lead-to-electrode connecting regions.

Finally, the safety characteristics of the battery of the present invention can be further improved if each lead positioned at the outermost has insulating tape on the side towards the center of the spiral electrode unit to assure that each lead will not touch another electrode.

DETAILED DESCRIPTION OF THE INVENTION

Embodiment A1

(Positive Electrode Strip Fabrication)

Figure 1:
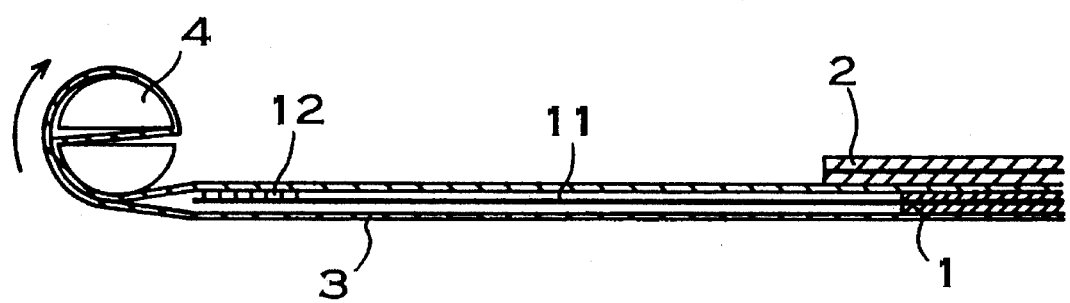
FIG. 1 is a side view showing a section of embodiment A1 of the present invention at the beginning of winding.

A slurry is prepared as the positive electrode active material by first sufficiently mixing 85 parts by weight of LiCoO2, 5 parts by weight of artificial graphite powder, and 5 parts by weight of carbon black. Next, 5 parts by weight of polyvinylidene fluoride (PVdF) dissolved in N-methyl-2-pyrrolidone is added as a solid to the previous mixture to form an ink-like slurry.

The positive electrode active material slurry is applied to both sides of an aluminum foil conducting core 355 mm long, 40 mm wide, and 20 μm thick. After drying, the electrode strip is pressed through a rolling mill. Note that an exposed electrode core region is formed by not applying slurry from the end of the aluminum foil to approximately 20 mm inboard. An aluminum lead (3 mm wide) is ultrasonically welded to the exposed electrode core region. The unit is subsequently vacuum dried for three hours at 110° C. to produce a finished positive electrode strip.

(Negative Electrode Strip Fabrication)

An ink-like negative electrode active material slurry is prepared by adding 5 parts by weight of PVdF dissolved in N-methyl-2-pyrrolidone as a solid to 95 parts by weight of 5 μm to 25 μm particle diameter natural graphite powder (3.35 Å layer distance).

The negative electrode active material slurry is applied to both sides of a copper foil conducting core 385 mm long, 40 mm wide, and 18 μm thick. After drying, the electrode strip is pressed through a rolling mill. Note that an exposed electrode core region is formed by not applying slurry from the end of the copper foil to approximately 20 mm inboard. A nickel lead (3 mm wide) is spot welded to the exposed electrode core region. The unit is subsequently vacuum dried for three hours at 110° C. to produce a finished negative electrode strip.

(Spiral Electrode Unit Fabrication)

Figure 2:
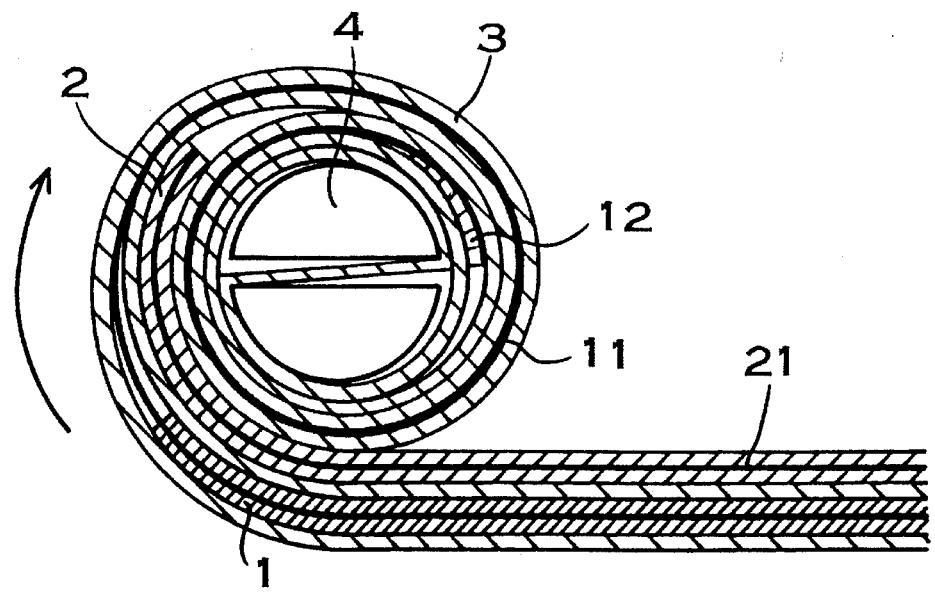
FIG. 2 is a side view showing lead and electrode positioning at the beginning of winding embodiment A1 of the present invention.
Figure 3:
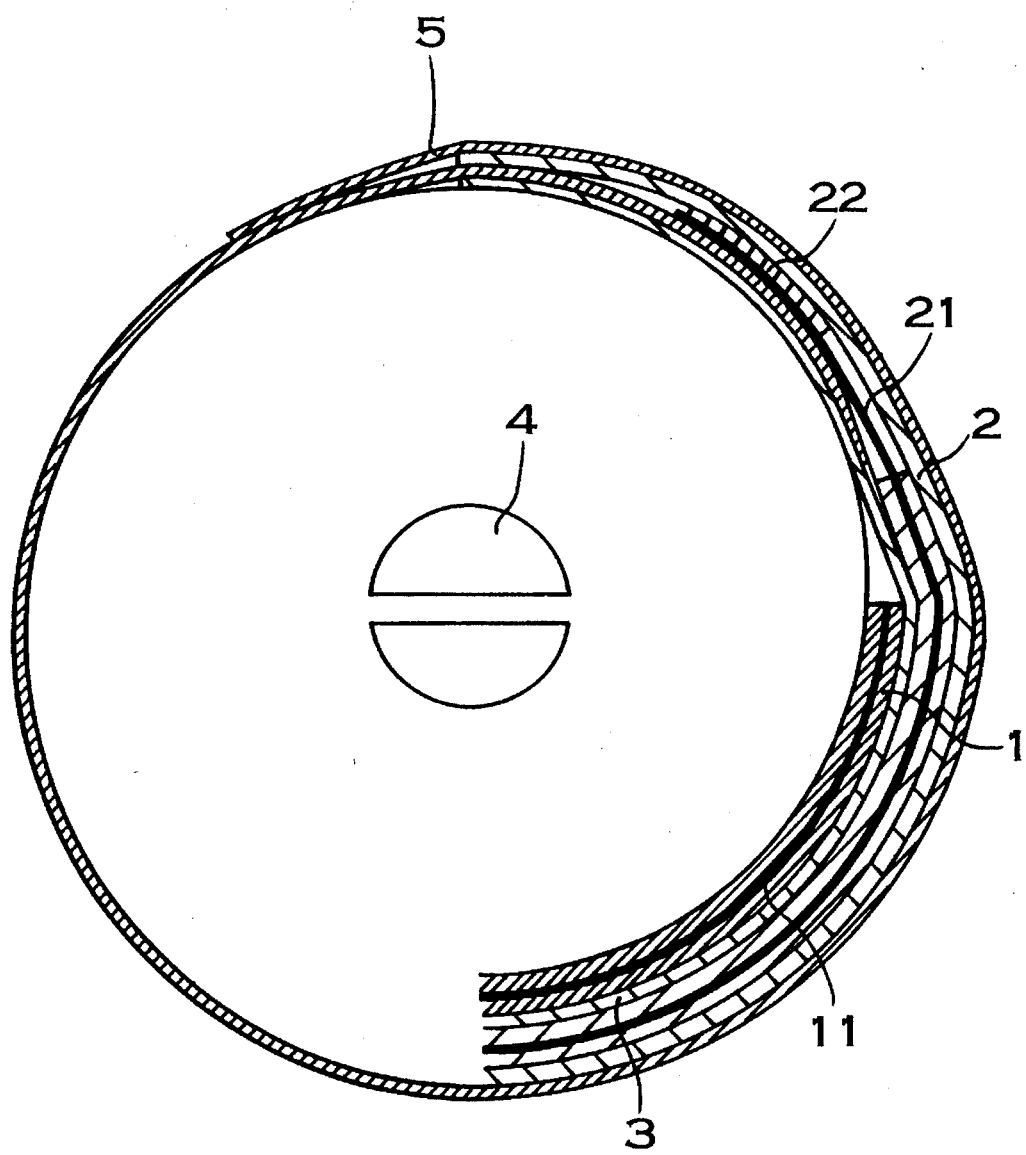
FIG. 3 is a side view showing a section of embodiment A1 of the present invention at the completion of winding.

Turning to FIGS. 1, 2, and 3, A spiral electrode unit is formed by rolling a positive electrode strip and a negative electrode strip with a polypropylene separator between the two. FIG. 1 shows a section of the spiral electrode unit at the beginning of winding, FIG. 2 shows lead and electrode relative positions at the beginning of winding, and FIG. 3 shows a section of the spiral electrode unit at the completion of winding. In all these figures, 1 is the positive electrode strip, 2 is the negative electrode strip, 3 is the separator, 4 is a winding spool (3 mm in diameter), 5 is insulating tape, 11 is the aluminum foil positive electrode conducting core, 12 is the positive electrode lead, 21 is the copper foil negative electrode conducting core, and 22 is the negative electrode lead.

As shown in FIG. 1, the spiral electrode unit is assembled by starting to wind the separator 3, the positive electrode strip 1, and the negative electrode strip 2 on the winding spool 4 in that order. The negative electrode is wound greater than or equal to 15 mm after the beginning of the positive electrode. As shown in FIG. 2, this means that the positive electrode lead 12 is sandwiched through separator material by positive electrode core 11 and by separator 3.

As shown by the section of spiral electrode unit at the completion of winding in FIG. 3, separator 3 is disposed on both sides of the negative electrode lead 22. Further, insulating tape 5 is attached starting at the end of the positive electrode active material. Subsequently the negative electrode lead 22 is wound onto the unit. This not only allows fastening of the spiral electrode into a solid unit, but also reliably keeps the negative electrode lead 22 away from the positive electrode strip.

A spiral electrode unit fabricated as described above is used as embodiment A1 of the present invention. Further, although polypropylene was used as insulating tape in the above description, substances such as polyethylene terephthalate, polyphenylene sulfide, or polyimide may be used in the same manner.

Comparison Example X1

(Positive Electrode Strip Fabrication)

The positive electrode strip is fabricated in the same manner as that of embodiment A1 except that the exposed electrode core region extends approximately 5 mm inboard from the end of the aluminum foil.

(Negative Electrode Strip Fabrication)

The negative electrode strip is fabricated in the same manner as that of embodiment A1 except that the exposed electrode core region extends approximately 5 mm inboard from the end of the copper foil.

(Spiral Electrode Unit Fabrication)

Figure 4:
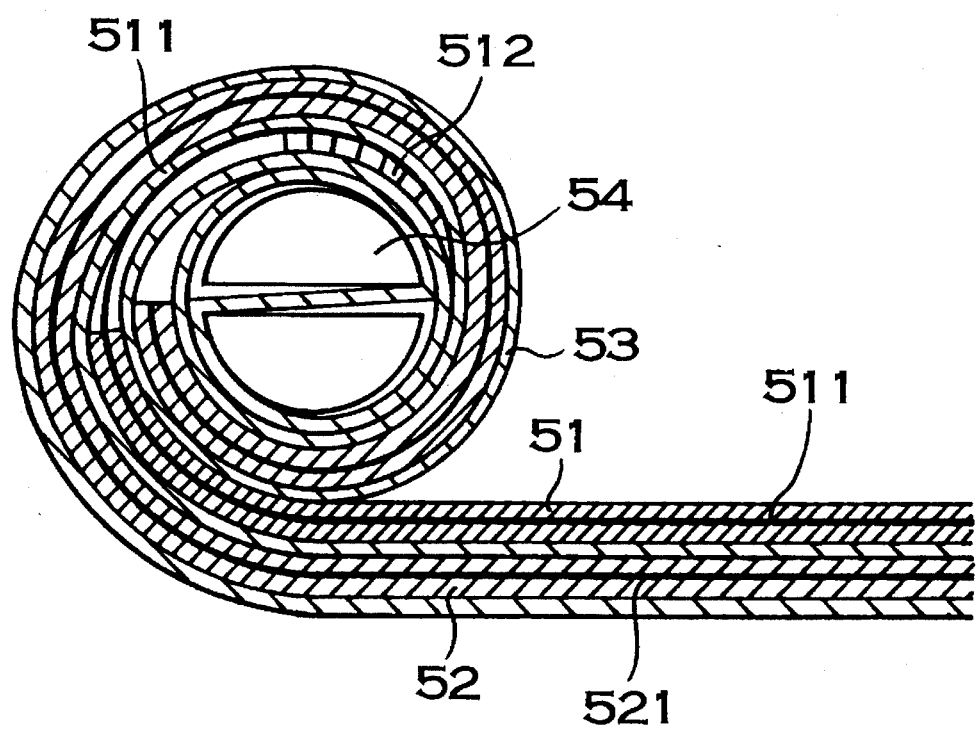
FIG. 4 is a side view showing lead and electrode positioning at the beginning of winding comparison example X1.
Figure 5:
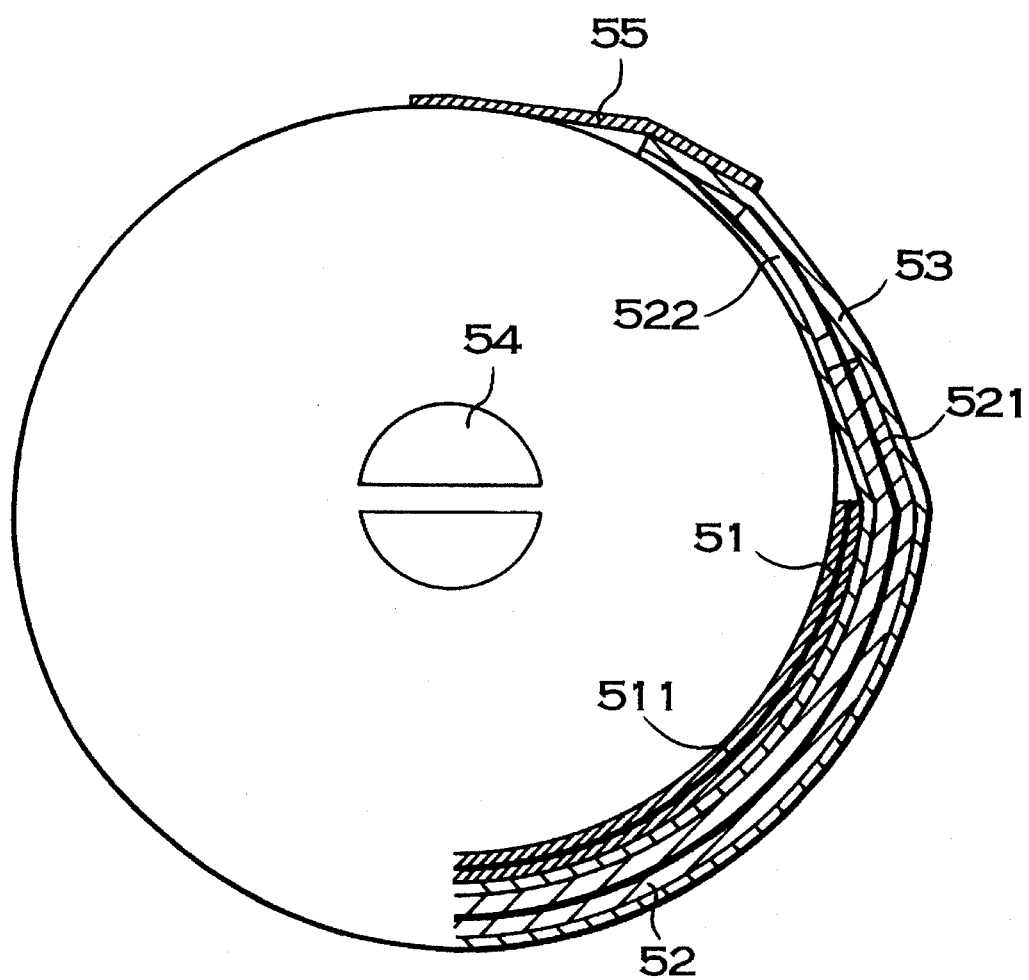
FIG. 5 is a side view showing a section of comparison example X1 at the completion of winding.

FIGS. 4 and 5 show sections of the spiral electrode unit at the start and completion of winding. It is clear from FIGS. 4 and 5 that since the exposed electrode core regions of comparison example X1 are short, leads 512 and 522 provided in these exposed core regions are assembled with lead surfaces adjacent (through separator material) to electrodes of opposite polarity.

In addition, the insulating tape 55 on the outermost winding of spiral electrode unit comparison example X1 attaches only to the end of the separator 53.

A spiral electrode unit fabricated as described above is used as comparison example X1.

Comparison Example X2

The spiral electrode unit of comparison example X2 is fabricated in the same manner as that of comparison example X1 except that protective tape 6 is provided on both sides of the lead-to-exposed electrode core connecting regions.

Figure 6:
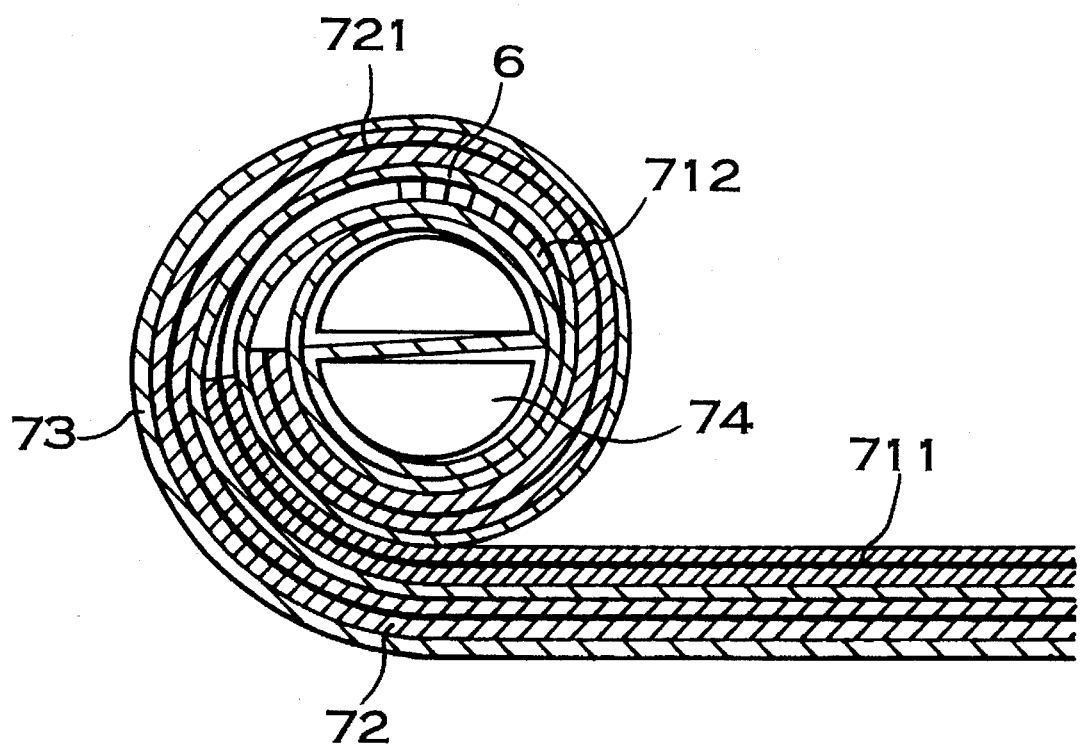
FIG. 6 is a side view showing lead and electrode positioning at the beginning of winding comparison example X2.
Figure 7:
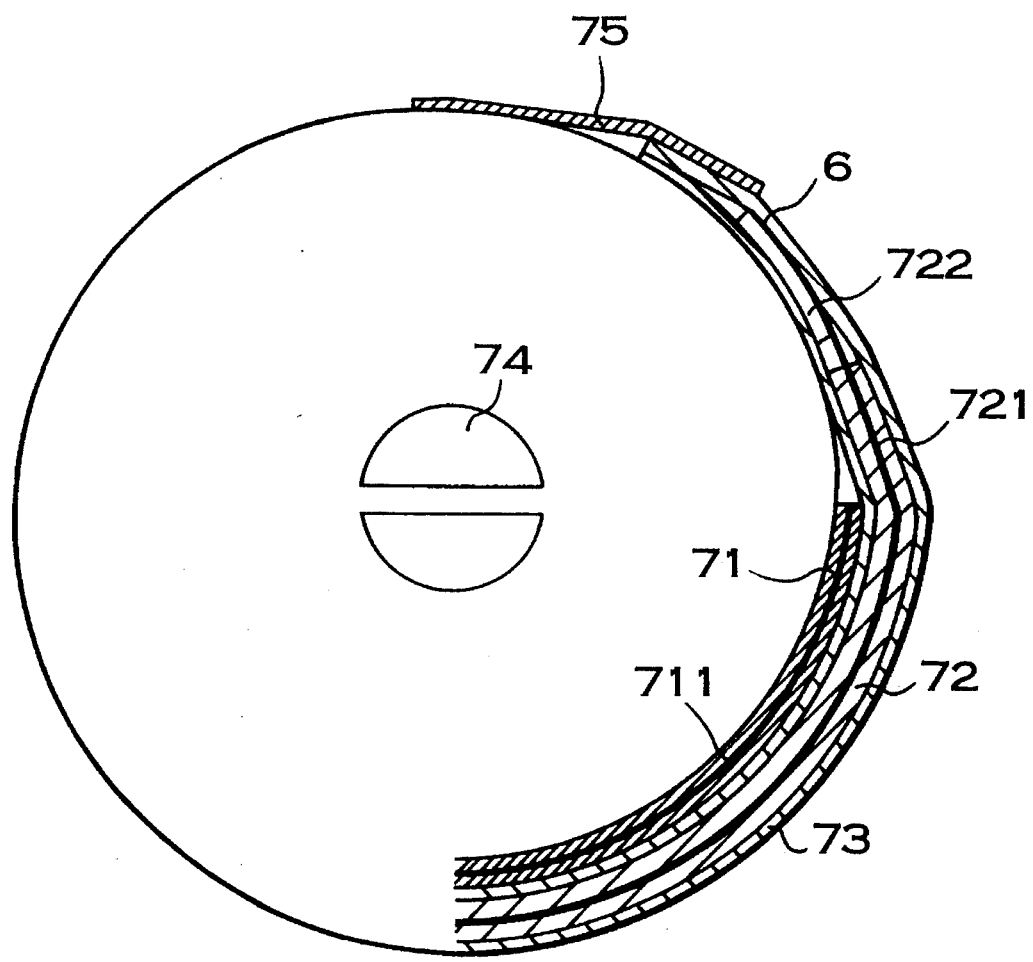
FIG. 7 is a side view showing a section of comparison example X2 at the completion of winding.

FIGS. 6 and 7 show sections of comparison example X2 at the start and completion of winding. Part numbers in FIGS. 4 through 7 with the highest order digit removed refer to parts named the same as similarly numbered parts in FIGS. 1 through 3.

Table 1 shows the amount of processing required for completion of the spiral electrode units of embodiment A1, comparison example X1, and comparison example X2 in terms of a processing index.

TABLE 1

|  | Processing Index |
| --- | --- |
| Embodiment A1 | 100 |
| Comparison Example X1 | 100 |
| Comparison Example X2 | 115 to 120 |

The processing index indicates the relative number of processing steps required for the comparison examples by normalizing the number of processing steps required for embodiment A1 of the present invention to 100.

As suggested from Table 1, after electrode fabrication, it is possible to complete fabrication of the spiral electrode units of embodiment A1 and comparison example X1 using only a winding apparatus. However, after lead connection for comparison example X2, the lead-to-electrode connecting region must be covered with protective tape in a special processing step (apparatus) resulting in an increased processing index.

Next, pressure was applied to embodiment A1, comparison example X1, and comparison example X2 to determine whether or not short circuits would occur when the spiral electrode units were crushed. The results of pressure application are shown in Table 2. Here, pressure was applied in two directions, vertically and horizontally, with respect to the positive electrode lead, and two pressure forces, 50 Kg/cm$^2$ and 100 Kg/cm$^2$, were applied to the units. Ten units were tested and measured under each set of conditions in the matrix and the number of units that short circuited are shown in Table 2.

TABLE 2

|  | Vertical Pressure | | Horizontal Pressure | |
| --- | --- | --- | --- | --- |
| Spiral Electrode Unit Prototype | 50 kg/cm$^2$ | 100 kg/cm$^2$ | 50 kg/cm$^2$ | 100 kg/cm$^2$ |
| Embodiment A1 | 0 | 1 | 0 | 0 |
| Comparison Example X1 | 3 | 9 | 0 | 4 |
| Comparison Example X2 | 0 | 3 | 0 | 0 |

From Table 2 it is clear that fewer short circuits occur as a result of external force application for embodiment A1 of the present invention than for comparison examples X1 and X2. No opposite polarity electrodes are positioned facing the front or back surfaces of each lead of embodiment A1 of the present invention. It is believed that this configuration enables prevention of short circuits even when external force is applied to the spiral electrode unit.

As indicated above, eliminating the presence of an opposite polarity electrode facing either side of a lead avoids a major cause of internal short circuits (particularly in the case of external force application). In this manner a battery of the present invention can reduce the possibility of short circuits to the extreme even in the unlikely event of separator damage due to conditions such as heat and pressure.

Furthermore, since protective tape or other material is not required at lead connecting regions, efficient (continuous processing) manufacturing is possible.

It should be noted that the positive electrode strip was wound onto the winding spool first in the above embodiment of the present invention. However, the same results can be obtained by winding the negative electrode strip on to the winding spool first.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A battery comprising:
    a spiral electrode unit with leads established at exposed regions of conducting electrode core material, including
    (1) a positive electrode strip which is conducting core material covered with active material;
    (2) a negative electrode strip which is conducting core material covered with active material, and which is laminated with the positive electrode strip via a separator; and characterized in that
        (1) regions of electrodes of the same polarity reside via the separator on both sides of the exposed regions of electrode core material, where leads are established; and
        (2) one of the leads is positioned at the outermost winding of the spiral electrode unit.

2. A battery with a spiral electrode unit as recited in claim 1 wherein a lead is connected at the end of the exposed region of positive electrode core material, where active material slurry is not applied from the end of the positive electrode core to approximately 20 mm inboard.

3. A battery with a spiral electrode unit as recited in claim 1 wherein a lead is connected at the end of the exposed region of negative electrode core material, where active material slurry is not applied from the end of the negative electrode core to approximately 20 mm inboard.

4. A battery with a spiral electrode unit as recited in claim 1 wherein the spiral electrode unit has a winding spool at its center.

5. A battery with a spiral electrode unit as recited in claim 1 wherein the spiral electrode unit is formed by winding the separator, the positive electrode strip, and the negative electrode strip around a winding spool in that order, and wherein the positive electrode lead is established at the center region of the spiral electrode unit and the negative electrode lead is established at the perimeter region of the spiral electrode unit.

6. A battery with a spiral electrode unit as recited in claim 5 wherein the negative electrode strip is wound onto the spiral electrode unit greater than or equal to 15 mm after the beginning of the positive electrode strip.

7. A battery with a spiral electrode unit as recited in claim 1 wherein insulating tape is disposed on the side of the lead positioned at the outermost winding of the spiral electrode unit which faces towards the center of the spiral electrode unit.

8. A battery with a spiral electrode unit as recited in claim 1 wherein insulating tape is disposed on the side of the lead positioned at the outermost winding of the spiral electrode unit which faces towards the center of the spiral electrode unit and on the side of the lead facing outward.

9. A battery with a spiral electrode unit as recited in claim 1 wherein the insulating tape is polypropylene, polyethylene, polyethylene terephthalate, polyphenylene sulfide, or polyimide.

10. A battery with a spiral electrode unit as recited in claim 1 wherein the positive electrode conducting core material is aluminum foil.

11. A battery with a spiral electrode unit as recited in claim 1 wherein the negative electrode conducting core material is copper foil.

12. A battery comprising:
    a spiral electrode unit with leads established at exposed regions of conducting electrode core material, including
    (1) a positive electrode strip which is conducting core material covered with active material;
    (2) a negative electrode strip which is conducting core material covered with active material, and which is laminated with the positive electrode strip via a separator; and characterized in that
        (1) separator material resides on both sides of the exposed regions of electrode core material, where leads are established, and still more separator resides outside that separator material; and
        (2) one of the leads is positioned at the outermost winding of the spiral electrode unit.

13. A battery with a spiral electrode unit as recited in claim 12 wherein a lead is connected at the end of the exposed region of positive electrode core material, where active material slurry is not applied from the end of the positive electrode core to approximately 20 mm inboard.

14. A battery with a spiral electrode unit as recited in claim 12 wherein a lead is connected at the end of the exposed region of negative electrode core material, where active material slurry is not applied from the end of the negative electrode core to approximately 20 mm inboard.

15. A battery with a spiral electrode unit as recited in claim 12 wherein the spiral electrode unit has a winding spool at its center.

16. A battery with a spiral electrode unit as recited in claim 12 wherein the spiral electrode unit is formed by winding the separator, the positive electrode strip, and the negative electrode strip around a winding spool in that order, and wherein the positive electrode lead is established at the center region of the spiral electrode unit and the negative electrode lead is established at the perimeter region of the spiral electrode unit.

17. A battery with a spiral electrode unit as recited in claim 16 wherein the negative electrode strip is wound onto the spiral electrode unit greater than or equal to 15 mm after the beginning of the positive electrode strip.

18. A battery with a spiral electrode unit as recited in claim 12 wherein insulating tape is disposed on the side of the lead positioned at the outermost winding of the spiral electrode unit which faces towards the center of the spiral electrode unit.

19. A battery with a spiral electrode unit as recited in claim 12 wherein insulating tape is disposed on the side of the lead positioned at the outermost winding of the spiral electrode unit which faces towards the center of the spiral electrode unit and on the side of the lead facing outward.

20. A battery with a spiral electrode unit as recited in claim 12 wherein the insulating tape is polypropylene, polyethylene, polyethylene terephthalate, polyphenylene sulfide, or polyimide.

21. A battery with a spiral electrode unit as recited in claim 12 wherein the positive electrode conducting core material is aluminum foil.

22. A battery with a spiral electrode unit as recited in claim 12 wherein the negative electrode conducting core material is copper foil.

* * * * *